United States Patent [19]
Houters et al.

[11] Patent Number: 5,573,095
[45] Date of Patent: Nov. 12, 1996

[54] FAN CLUTCH CONSTRUCTION AND METHOD OF MAKING THE SAME

[75] Inventors: Neil T. Houters, Arlington; James A. Jennings, Azle, both of Tex.

[73] Assignee: Dayco Products, Inc., Dayton, Ohio

[21] Appl. No.: 233,910

[22] Filed: Apr. 28, 1994

[51] Int. Cl.⁶ .................................................. F16D 35/02
[52] U.S. Cl. ........................................ 192/58.7; 29/889.5
[58] Field of Search ........................... 192/58 B; 29/889.5

[56] References Cited

U.S. PATENT DOCUMENTS

| | | | |
|---|---|---|---|
| 3,155,209 | 11/1964 | Weir | 192/82 T X |
| 3,191,733 | 6/1965 | Weir | 192/58 B |
| 3,227,254 | 1/1966 | Sutaruk | 192/58 B |
| 3,964,582 | 6/1976 | Mitchell | 192/58 B |
| 4,383,597 | 5/1983 | Blair | 192/58 B |
| 4,564,094 | 1/1986 | Storz | 192/58 B |
| 4,938,328 | 7/1990 | Kennedy | 192/58 B |
| 4,938,329 | 7/1990 | Kennedy | 192/58 B |
| 5,062,514 | 11/1991 | Kennedy et al. | 192/82 T |
| 5,190,131 | 3/1993 | Hagiarara | 192/58 B |

OTHER PUBLICATIONS

Prior known fan clutch construction illustrated in FIG. 4 of this patent application.

*Primary Examiner*—Rodney H. Bonck
*Attorney, Agent, or Firm*—Joseph V. Tassone

[57] ABSTRACT

A fan clutch construction and method of making the same are provided, the fan clutch construction comprising a drive plate rotatably mounted in a chamber of a housing and a scoop plate disposed in the chamber and being operatively interconnected to the housing to cause rotation of the housing when the scoop plate is rotated by the rotation of the drive plate, the scoop plate having a dam that cooperates with the drive plate to cause rotation of the scoop plate through a fluid coupling drive arrangement with the drive plate, the dam having a surface that provides a substantially zero clearance with the drive plate when relative movement is provided between the drive plate and the scoop plate.

14 Claims, 4 Drawing Sheets

5,573,095

FAN CLUTCH CONSTRUCTION AND METHOD OF MAKING THE SAME

BACKGROUND OF THE INVENTION

1. Field of the Invention

This invention relates to a new fan clutch construction, such as for cooling the radiator of an internal combustion engine, and to a new method of making such a fan clutch construction.

2. Prior Art Statement

It is known to provide a fan clutch construction comprising a housing means having a chamber therein, a drive plate rotatably mounted in the chamber, and a scoop plate disposed in the chamber and being operatively interconnected to the housing means to cause rotation of the housing means when the scoop plate is rotated by the rotation of the drive plate, the scoop plate having a dam thereon that cooperates with the drive plate to cause rotation of the scoop plate through a fluid coupling drive arrangement with the drive plate, the dam comprising a portion of the scoop plate coined or deformed out of the same to have a surface means thereof that provides a slight clearance with the drive plate when relative movement is provided between the drive plate and the scoop plate. For example, see FIG. 4 of this application.

Also see the Kennedy et al, U.S. Pat. No. 5,062,514 for a similar fan clutch construction.

SUMMARY OF THE INVENTION

It is one of the features of this invention to provide a fan clutch construction that has a unique dam on the scoop plate thereof that increases the efficiency of the fan clutch construction.

In particular, it was found that the evacuation efficiency of a prior known high torque fan drive with a low inertia, low load engine cooling fan needed improvement.

In addition, such prior known fan clutch construction was found to have excessive assembly line scrap due to stack up tolerances caused by rubbing between the drive plate and the dam of the scoop plate. Also, premature clutch failure due to bearing wear is caused by axial run out of the drive plate and the dam of the scoop plate whereby the end result is high internal clutch temperatures from frictional heat and premature failure of the bearing seal, the O-rings and the silicone fluid.

However, it was found according to the teachings of this invention that the scoop plate can be provided with a unique dam that allows reduction of the clearance between the drive plate and the dam or even allows contact therebetween whereby the result is greatly improved pumping action, no assembly scrap due to rubbing and no friction heat related failures in the field due to bearing wear.

In fact, it has been found that the unique dam of this invention permits zero clearance and the ability of the fan clutch construction to compensate for wear by allowing the dam to "run-in" without generating excessive frictional heating.

For example, one embodiment of this invention comprises a fan clutch construction comprising a housing means having a chamber therein, a drive plate rotatably mounted in the chamber, and a scoop plate disposed in the chamber and being operatively interconnected to the housing means to cause rotation of the housing means when the scoop plate is rotated by the rotation of the drive plate, the scoop plate having a dam thereon that cooperates with the drive plate to cause rotation of the scoop plate through a fluid coupling drive arrangement with the drive plate, the dam having a surface means that provides a substantially zero clearance with the drive plate when relative movement is provided between the drive plate and the scoop plate.

Accordingly, it is an object of this invention to provide a new fan clutch construction having one or more of the novel features of this invention as set forth above or hereinafter shown or described.

Another object of this invention is to provide a new method of making such a fan clutch construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
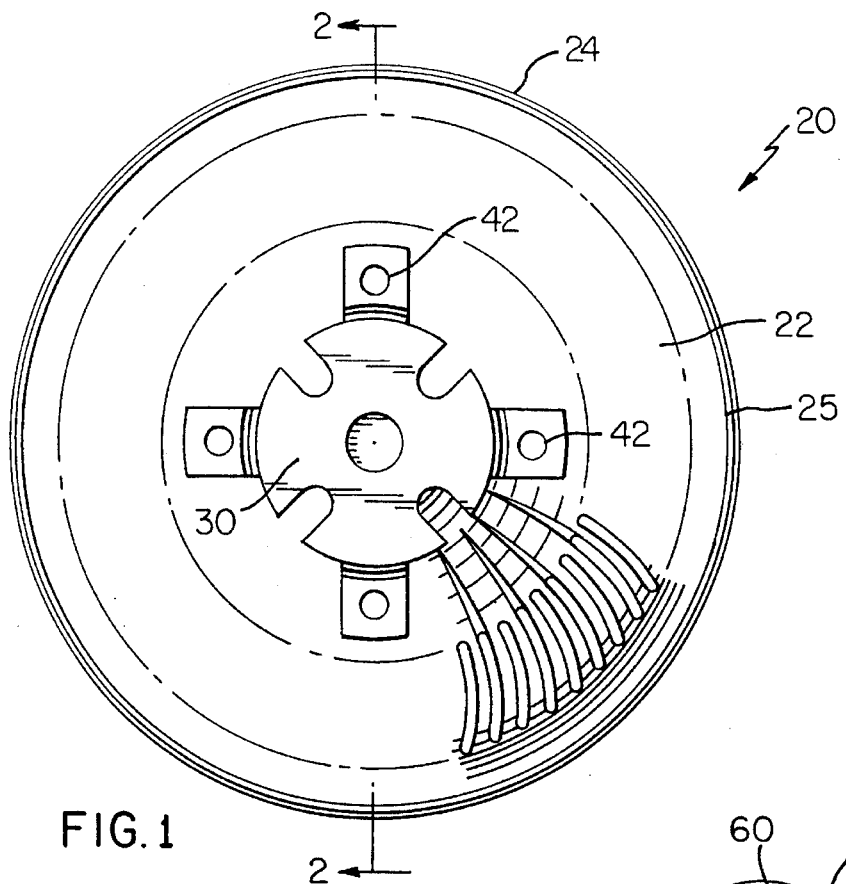
FIG. 1 is an end view of the new fan clutch construction of this invention.

While the various features of this invention are hereinafter illustrated and described as being particularly adapted to provide a fan clutch construction of a particular configuration, it is to be understood that the various features of this invention can be utilized singly or in various combinations thereof to provide fan clutch constructions of other types as desired.

Therefore, this invention is not to be limited to only the embodiment illustrated in the drawings, because the drawings are merely utilized to illustrate one of the wide variety of uses of this invention.

Figure 2:
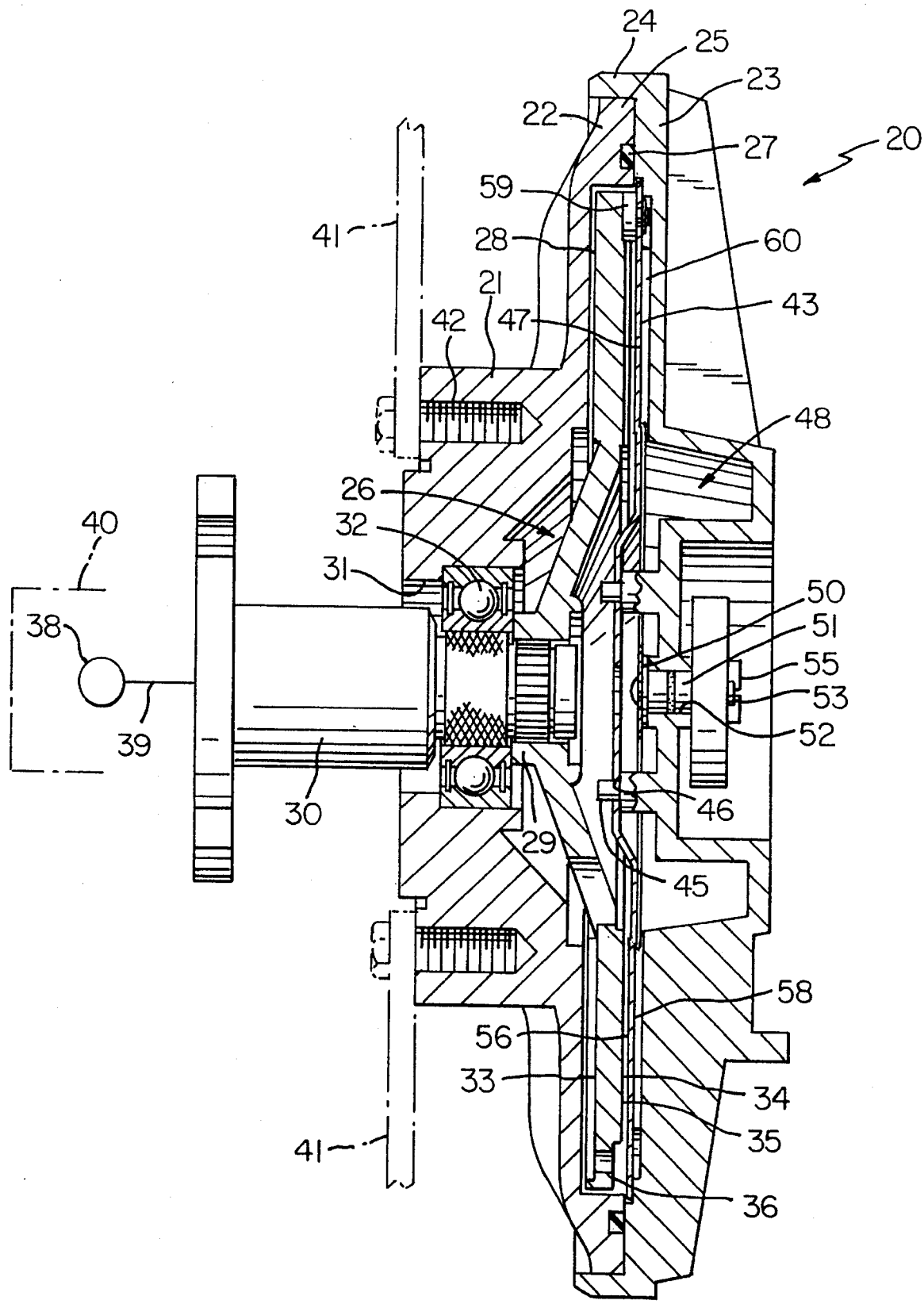
FIG. 2 is an enlarged cross-sectional view taken on line 2—2 of FIG. 1.
Figure 3:
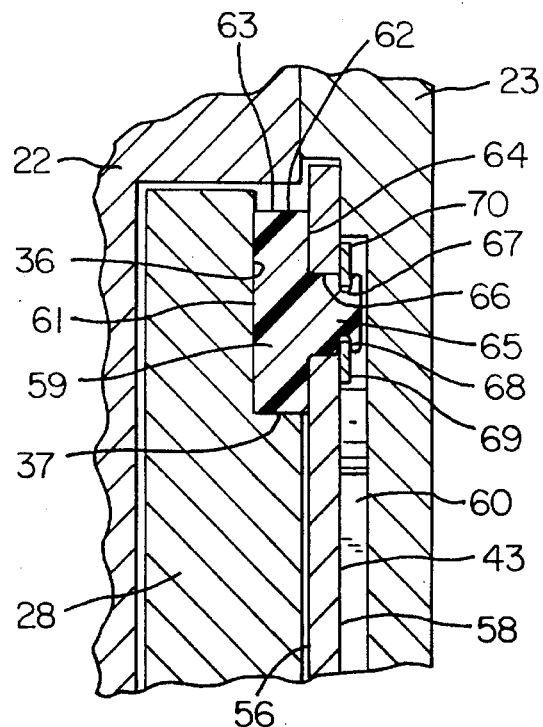
FIG. 3 is an enlarged fragmentary view of a portion of the structure illustrated in FIG. 2.

Referring now to FIGS. 1, 2 and 3, the new fan clutch construction of this invention is generally indicated by the reference numeral 20 and comprises a housing means 21 formed from a first housing part 22 and a second housing part 23 secured together by having the outer peripheral edge means 24 of the housing part 23 turned over the outer peripheral edge means 25 of the housing part 22 in a conventional manner to define a chamber 26 in the housing means 21 that is sealed from the exterior thereof by an annular O-ring sealing member 27 disposed between the housing parts 22 and 23.

A drive plate 28 is disposed in the chamber 26 and has a hub 29 fixed on a shaft means 30 that is rotatably mounted in an opening 31 in the housing part 22 by a bearing means 32 all in a manner well known in the art, the drive plate 28 having opposite sides 33 and 34 with the side 34 having an inner substantially flat surface 35 and an outer substantially flat surface 36 that is inwardly stepped relative to the surface 35 to define an annular shoulder 37 between the surfaces 35 and 36.

The shaft means 30 of the fan clutch construction 20 is adapted to be mounted to any suitable drive means, such as drive means 38 illustrated in FIG. 2 by an interconnection means 39 in a manner well known in the art whereby the drive means 38 is adapted to rotate the shaft 30 and, thus, the drive plate 28 in the proper direction thereof. As is well known in the art, the drive means 38 can comprise a water pump construction of an internal combustion engine 40 while the housing means 21 is adapted to carry a plurality of fan blades 41 that are bolted thereto at the bolt holes 42 formed in the housing part 22 in a manner well known in the art so that when the housing means 21 is subsequently rotated by the drive plate 28 in a manner hereinafter set forth, the fan blades 41 can provide a cooling air flow over a radiator means of the engine means 40 that is disposed to the right of the fan clutch construction 20 when viewing FIG. 2.

Figure 6:
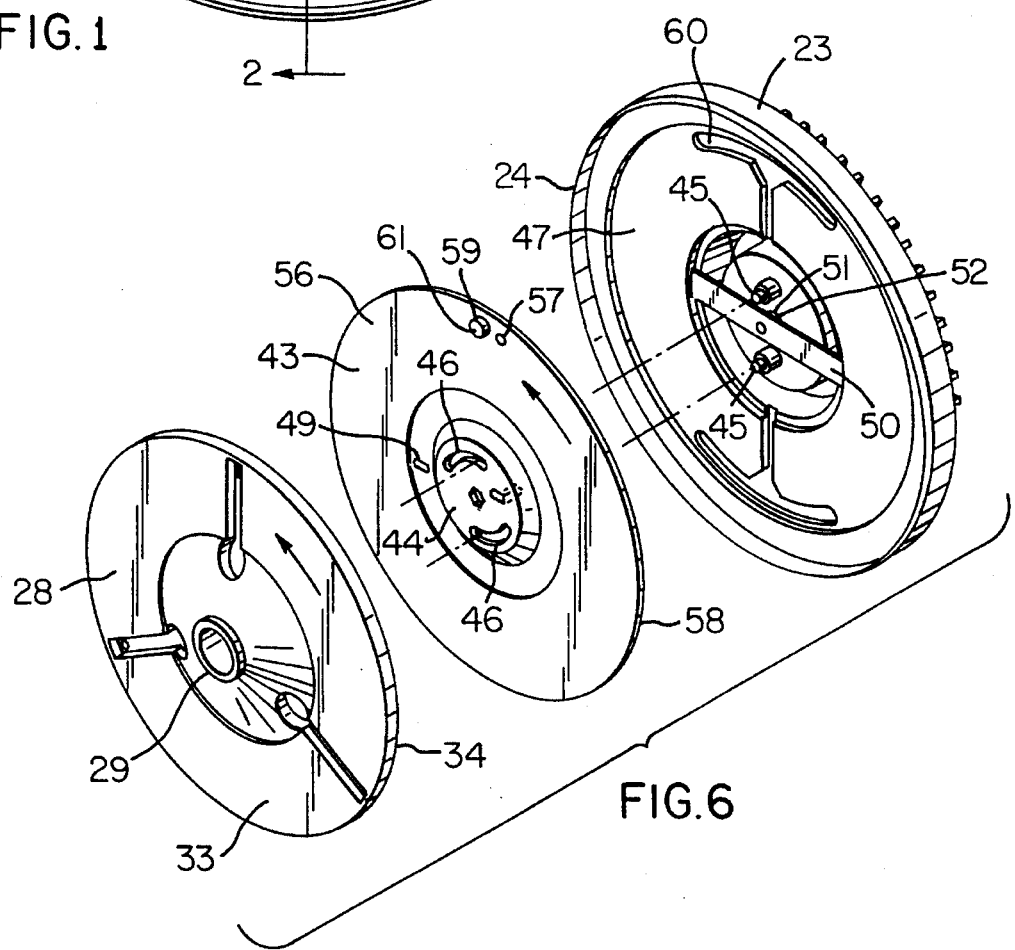
FIG. 6 is an exploded perspective view of the other side of certain parts of the fan clutch construction of FIG. 5.

A scoop plate 43 is disposed in the chamber 26 of the housing means 21 and has a central part 44 splined to the housing part 23 by having a pair of posts 45 of the housing part 23 received in respective slots 46 passing through the central part 44 of the scoop plate 43 as illustrated in FIGS. 2 and 6 whereby when the scoop plate 43 is fluidly driven by the drive plate 28 in a manner hereinafter set forth, the scoop plate 43 will rotate the housing means 21 therewith and thus rotate the fan blades 41 all in a manner well known in the art. For example, see the aforementioned Kennedy et al, U.S. Pat. No. 5,062,514 whereby this U.S. patent is being incorporated into this disclosure by this reference thereto.

The scoop plate 43 cooperates with a side 47 of the housing part 23 to cover a cavity or reservoir 48 formed therein that contains a silicone oil (not shown) which is permitted to exit from the reservoir 48 through an opening 49 in the scoop plate 43 when a valve member 50 is rotated to uncover the opening 49 of the scoop plate 43 in a manner well known in the art.

In particular, the valve member 50 is carried on a shaft 51 rotatably mounted in a suitable opening means 52 formed through the housing part 23 and having its outer end 53 interconnected to one end of a coiled bimetallic member 54 that has its outer end fixed between abutment means 55 of the housing part 23 so that when the bimetallic coil 54 senses a certain increased temperature condition that is greater than a certain temperature, the bimetallic member 54 will open the valve member 50 away from the opening 49 and when the bimetallic member 54 senses a decreasing temperature that falls below another certain temperature a certain amount, the bimetallic member 54 will move the valve member 50 to close the opening 49 in the scoop plate 43 all in a manner well known in the art.

Thus, when the bimetallic member 54 senses a temperature above a certain temperature, the same causes the silicone oil from the reservoir 48 to flow between the drive plate 28 and the scoop plate 43 at the respective surface means 35 and 56 thereof and through the resulting fluid coupling thereof cause the scoop plate 43 to tend to rotate with the drive plate 28 and thereby cause the housing means 21 to rotate and provide a cooling air flow with the fan blades 41 all in a manner well known in the art. When the bimetallic member 54 senses a temperature below a predetermined temperature, the bimetallic member 54 causes the valve member 50 to close the opening 49 in the scoop plate 43 so that the silicone oil that returns to the reservoir 48 cannot leave the same and thereby terminates the fluid coupling between the drive plate 28 and the scoop plate 43 so that the housing means 21 ceases to rotate with the drive plate 28 as is well known in the art.

Also, as is well known in the art, the scoop plate 43 does not rotate as fast as the drive plate 28 during the fluid coupling thereof because the fan blades 41 provide a resistance to such rotating motion and such rotational differential in speed between the drive plate 28 and the scoop plate 43 causes the silicone oil that is moving outwardly between the surface means 35 and 56 of the drive plate 28 and scoop plate 43 to be pumped back to the reservoir 48 through an opening 57 passing through opposed sides 56 and 58 of the scoop plate 43 and flow through a T-shaped groove means 60 formed in the surface 47 of the housing part 23 back to the reservoir 48 to again be circulated through the opening 49 in the scoop plate 43 to pass between the surface means 35 and 56 of the drive plate 28 and scoop plate 43.

Figure 5:
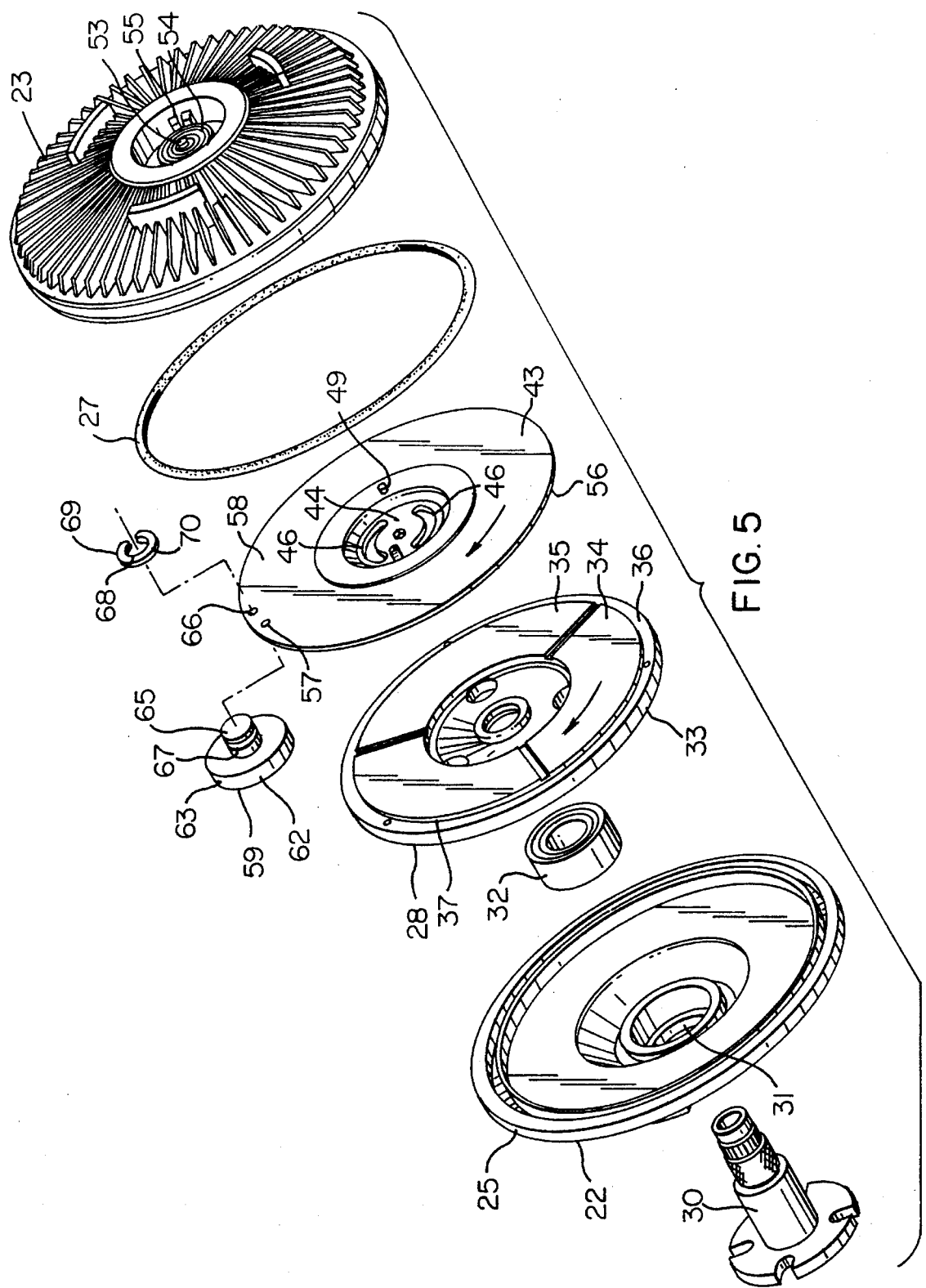
FIG. 5 is an exploded perspective view of certain parts of the fan clutch construction of FIGS. 1–3, FIG. 5 illustrating the dam and its securing clip greatly enlarged relative to the other parts illustrated in FIG. 5.

In order to cause the silicone oil to pump through the hole 57 in the scoop plate 43, a dam 59 is carried on the side 56 of the scoop plate 43 and cooperates with the surface means 36 and shoulder 37 of the drive plate 28 to back up the circulating oil at the outer peripheral surface means of the drive plate 28 and scoop plate 43 to pump through the hole 57, the hole or opening 57 being located adjacent the dam 59 on the trailing side thereof when the drive plate 28 and scoop plate are being rotated in a counterclockwise direction as indicated by arrows in FIGS. 5 and 6.

As previously stated, a prior known fan clutch construction has the dam thereof formed integral and one-piece with the scoop plate.

Figure 4:
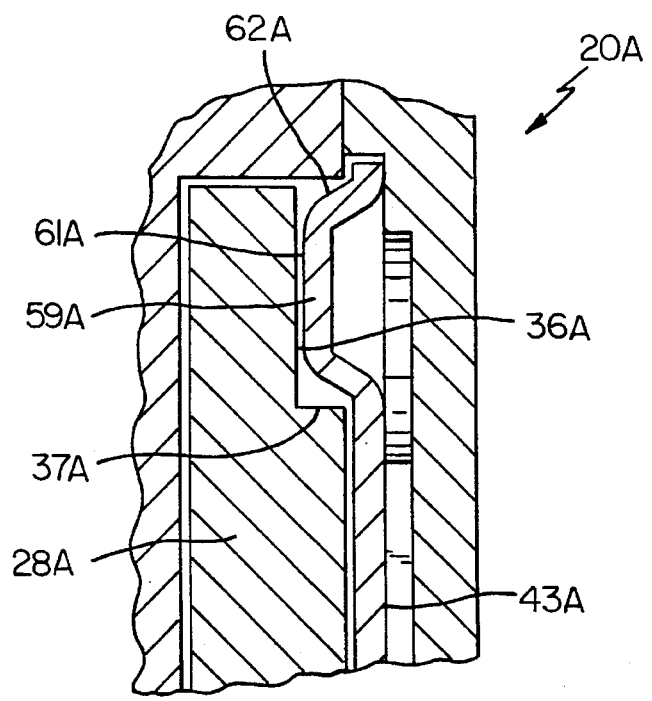
FIG. 4 is a view similar to FIG. 3 and illustrates a prior known fan clutch construction.

In particular, reference is now made to FIG. 4 wherein the prior known fan clutch construction is generally indicated by the reference numeral 20A and parts thereof similar to the parts of the fan clutch construction 20 of this invention are indicated by like reference numerals followed by the reference letter "A".

As illustrated in FIG. 4, the dam 59A of the scoop plate 43A is coined or deformed therefrom so as to define a surface means 61 that is disposed closely adjacent the surface means 36A of the drive plate 28A and to define an annular peripheral edge means 62A that is also disposed closely adjacent the annular shoulder 37A of the drive plate 28A.

Because the scoop plate 43A and the drive plate 28A are respectively formed of metallic material, any engagement of the scoop plate 43A with the drive plate 28A will create an adverse frictional situation whereby a close tolerance of the surface means 61A of the dam 59A with the surface means 36A of the drive plate 28A is not possible even though it is well known that the closer the surface means 61A is with the surface means 36A of the drive plate 28A the more efficient the fluid coupling arrangement will be provided between the drive plate 28A and the scoop plate 43A. It has been found that such clearance in the prior known fan clutch construction 20A between the surface means 36A and 61A thereof is approximately 0.012 of an inch to approximately 0.015 of an inch.

In order to increase the efficiency of the prior known fan clutch construction 20A, the scoop plate 43A is provided with another dam 61A at a location diametrically opposite the dam 61A illustrated in FIG. 4.

However, the aforementioned problems with such prior known dam 61A in the fan clutch construction 20A still exist.

In contrast, it was found that the dam 59 of this invention can be formed of a high temperature polymeric material that is injection molded into the configuration illustrated in the drawings so as to be secured to the scoop plate 43 in a manner hereinafter described and to provide a substantially zero clearance of the surface means 61 thereof with the surface means 36 of the drive plate 28, such zero clearance providing an improved pumping efficiency that is at least twice the efficiency provided by the prior known dam 59A so that only one dam 59 is required on the scoop plate 43 of this invention to provide an evacuation efficiency for the silicone oil that is even higher than the use of two prior known dams 59A in the fan clutch construction 20A previously described.

In one working embodiment of the dam 59 of this invention, the same comprises 40% glass filled polyphenylenesulfide sold by the DuPont Corporation of Wilmington, Del. under the trademark RYTON, the dam 59 being injection molded to define an enlarged head 63 that has the surface means 61 thereof being substantially flat and the peripheral edge means 62 thereof being substantially circular and having a surface means 64 opposite to the surface means 61. The dam 59 has a reduced cylindrical section 65 extending from the side 64 thereof and passing through an opening 66 through the scoop plate 43 to the other side 58 thereof, the cylindrical section 65 having an annular groove 67 therein and receiving a portion 68 of a C-clip 69 therein so that an outer portion 70 of the C-clip 69 engages against the side 58 of the scoop plate 43 to hold the side 64 of the enlarged head 63 of the dam 59 against the side 56 of the scoop plate 63.

The one working embodiment of the dam 59 of this invention when assembled to the scoop plate 43 by the C-clip 69 in the manner previously set forth can have the surface means 61 thereof provide a substantially zero clearance with the surface means 36 of the drive plate 28 when the fan clutch construction 20 is initially assembled together by having the surface means 61 initially provide anywhere between and including an interference fit with the surface means 36 of approximately 0.005 of an inch to approximately 0.0035 of an inch clearance with the surface means 36 of the drive plate 28. In addition, the peripheral edge means 62 of the dam 59 can provide an initial interference with the annular shoulder 37 of the drive plate 28 of approximately 0.002 to approximately 0.004 of an inch or can initially provide up to a 0.0035 of a clearance therewith.

In this manner, even though an interference is provided between the dam 59 and the drive plate 28 at the initial assembly thereof, by forming the dam 59 of the high temperature polymeric material and the drive plate 28 of 380 aluminum, the dam 59 permits the fan clutch construction 20 to compensate for wear by allowing the dam 59 to "run in" without generating excessive frictional heating. Thus, the prior known requirement for limiting the assembly to a minimum clearance to allow for manufacturing tolerances and normal bearing wear is not required when using the dam 59 of this invention.

The dam 59 in such one working embodiment of this invention has the enlarged head 63 thereof provided with a diameter of approximately 0.300 of an inch and a length of approximately 0.070 of an inch while the section 65 thereof has a diameter of approximately 0.125 of an inch and a length of approximately 0.085 of an inch. The annular groove 67 of such dam 59 is approximately 0.020 of an inch wide and begins approximately 0.015 of an inch from the free end of the section 65. The dam 59 is mounted to the scoop plate 43 so as to be substantially in the same location as the prior known dam 59A.

Accordingly, it has been found that the dam 59 of this invention results not only in greatly improved pumping efficiency but also results in substantially no assembly scrap due to rubbing and substantially no friction heat related failures in the field due to bearing wear.

Thus, it can be seen that this invention not only provides a new fan clutch construction, but also this invention provides a new method of making such a fan clutch construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a fan clutch construction comprising a housing means having a chamber therein, a drive plate rotatably mounted in said chamber, and a scoop plate rotatably mounted in said chamber, and a scoop plate disposed in said chamber and being operatively interconnected to said housing means to cause rotation of said housing means when said scoop plate is rotated by the rotation of said drive plate, said scoop plate having a dam thereon that cooperates with said drive plate to cause rotation of said scoop plate through a fluid coupling drive arrangement with said drive plate, said dam having a surface means that provides a substantially zero clearance with said drive plate when relative movement is provided between said drive plate and said scoop plate, said dam comprising a part that is initially separate from said scoop plate and then is secured thereto, said scoop plate having an opening passing therethrough, said dam having a section thereof extending through said opening of said scoop plate, and a clip attached to said section to secure said dam to said scoop plate, said scoop plate having opposite sides, said dam having an enlarged head disposed against one of said opposite sides of said scoop plate and having said surface means thereon, the improvement wherein said section of said dam is integral and one-piece with said enlarged head and has an annular groove therein that is disposed outboard of said opening of said scoop plate, said clip having a portion thereof received in said annular groove and another portion thereof disposed against the other of said opposite sides of said scoop plate.

2. A fan clutch construction as set forth in claim 1 wherein said substantially zero clearance is provided by said surface means of said dam initially providing an interference with said drive plate and then being operated therewith to create a run in condition thereof.

3. A fan clutch construction as set forth in claim 1 wherein said substantially zero clearance is provided by said surface means of said dam initially providing an interference with said drive plate of approximately 0.005 of an inch to an initial clearance with said drive plate of approximately 0.0035 of an inch.

4. A fan clutch construction as set forth in claim 1 wherein said dam is formed of polymeric material.

5. A fan clutch construction as set forth in claim 1 wherein said dam is formed of 40% glass filled polyphenylenesulfide.

6. A fan clutch construction as set forth in claim 1 wherein said dam is formed of a material that is different from the material of said scoop plate.

7. A fan clutch construction as set forth in claim 1 wherein said enlarged head of said dam has a circular transverse cross-sectional configuration and said section of said dam has a circular transverse cross-sectional configuration.

8. In a method of making a fan clutch construction comprising a housing means having a chamber therein, a drive plate rotatably mounted in said chamber, and a scoop plate disposed in said chamber and being operatively interconnected to said housing means to cause rotation of said housing means when said scoop plate is rotated by the rotation of said drive plate, said scoop plate having a dam thereon that cooperates with said drive plate to cause rotation of said scoop plate through a fluid coupling drive arrangement with said drive plate, said dam having a surface means that provides a substantially zero clearance with said drive plate when relative movement is provided between said drive plate and said scoop plate, said dam comprises a part that is initially separate from said scoop plate and then is secured thereto, said scoop plate having an opening passing therethrough, said dam having a section thereof extending through said opening of said scoop plate, and a clip attached to said section to secure said dam to said scoop plate, said scoop plate having opposite sides, said dam having an enlarged head disposed against one of said opposite sides of said scoop plate and having said surface means thereon, the improvement comprising the steps of forming said section of said dam to be integral and one-piece with said enlarged head and have an annular groove therein that is disposed outboard of said opening of said scoop plate, and forming said clip to have a portion thereof received in said annular groove and another portion thereof disposed against the other of said opposite sides of said scoop plate.

9. A method of making a fan clutch construction as set forth in claim 8 and comprising the step of forming said substantially zero clearance by forming said surface means of said dam to initially provide an interference with said drive plate and then operating therewith to create a run in condition thereof.

10. A method of making a fan clutch construction as set forth in claim 8 and comprising the step of forming said substantially zero clearance by forming said surface means of said dam to initially provide an interference with said drive plate of approximately 0.005 of an inch to an initial clearance with said drive plate of approximately 0.0035 of an inch.

11. A method of making a fan clutch construction as set forth in claim 8 and comprising the step of forming said dam of polymeric material.

12. A method of making a fan clutch construction as set forth in claim 8 and comprising the step of forming said dam of 40% glass filled polyphenylenesulfide.

13. A method of making a fan clutch construction as set forth in claim 8 and comprising the step of forming said dam of a material that is different from the material of said scoop plate.

14. A method of making a fan clutch construction as set forth in claim 4 and comprising the step of forming said enlarged head of said dam to have a circular transverse cross-sectional configuration and said section of said dam to have a circular transverse cross-sectional configuration.

* * * * *